Figure 1:
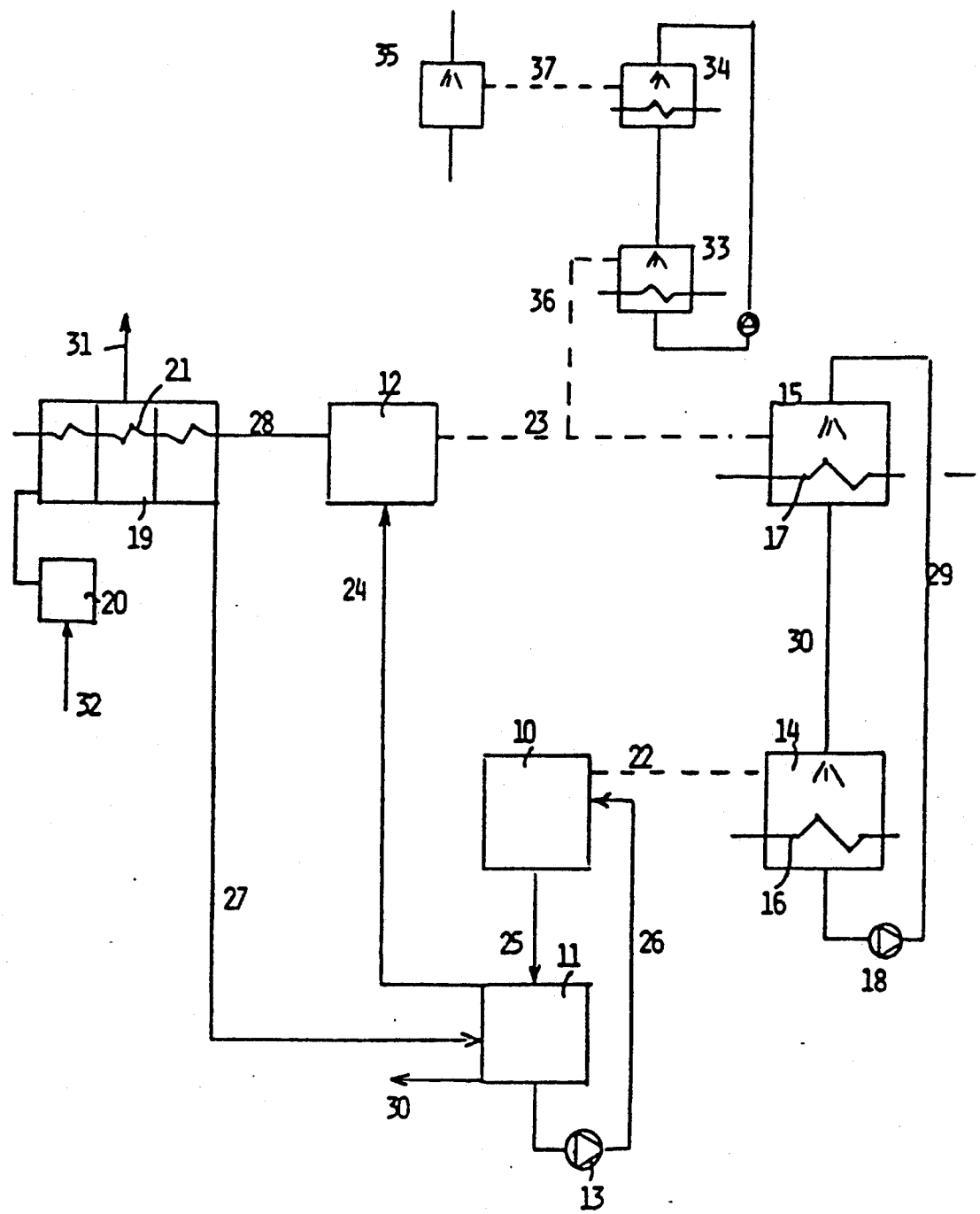

United States Patent [19]
Saari

[11] Patent Number: 5,181,396
[45] Date of Patent: Jan. 26, 1993

[54] METHOD OF FREEZING AND SEPARATION

[75] Inventor: Risto V. J. Saari, Luoma, Finland

[73] Assignee: A. Ahlstrom Corporation, Normarkku, Finland

[21] Appl. No.: 663,886

[22] PCT Filed: Sep. 27, 1989

[86] PCT No.: PCT/FI89/00185
§ 371 Date: Mar. 15, 1991
§ 102(e) Date: Mar. 15, 1991

[87] PCT Pub. No.: WO90/03208
PCT Pub. Date: Apr. 5, 1990

[30] Foreign Application Priority Data
Sep. 28, 1988 [FI] Finland .................. 884466

[51] Int. Cl.$^5$ .................. B01D 9/04; C02F 1/22
[52] U.S. Cl. .................. 62/541; 62/123; 62/542; 203/11
[58] Field of Search .................. 62/123, 532, 541, 542; 203/10, 11, 12, DIG. 8

[56] References Cited

U.S. PATENT DOCUMENTS

| | | | |
|---|---|---|---|
| 3,344,616 | 10/1967 | Owen | 62/532 |
| 4,236,382 | 12/1980 | Cheng | 62/123 |
| 4,314,455 | 2/1982 | Engdahl | 62/542 |
| 4,735,641 | 4/1988 | Engdahl | 62/532 |

FOREIGN PATENT DOCUMENTS

| | | |
|---|---|---|
| 015157 | 9/1980 | European Pat. Off. . |
| 078164 | 5/1983 | European Pat. Off. . |
| 088468 | 9/1983 | European Pat. Off. . |
| 259640 | 3/1988 | European Pat. Off. . |
| 1519207 | 4/1967 | France . |
| 1202423 | 8/1970 | United Kingdom . |

*Primary Examiner*—Ronald C. Capossela
*Attorney, Agent, or Firm*—Nixon & Vanderhye

[57] ABSTRACT

A method of freezing and separation for concentrating solutions, such as waste waters of the process industry, by means of waste heat of the same process, by freezing the solution in a crystallizer operating at the triple point, by transferring the ice crystals produced thereby into a melter, by absorbing the cold vapor generated in the crystallizer into an absorber of a first absorption heat pump, said absorber being cooled by cooling water, by evaporating a corresponding amount of vapor in a generator of the absorption heat pump, said generator being heated by the waste heat of the process and, by melting the ice crystals by this vapor. The solution to be treated is cooled near to the triple point in a multi-stage flash evaporator, the condensers of which are cooled by the pure liquid melted from the ice, and the excessive heat is removed from the process by absorbing part of the vapor being generated in the generator to a medium present in the absorber of a second absorption pump, which medium is more dilute than the medium used in the previous absorber.

10 Claims, 2 Drawing Sheets

METHOD OF FREEZING AND SEPARATION

The present invention relates to a method of freezing and melting a solution to enable the ingredients of the solution to be separated from each other and, more specifically, to such a method of freezing and melting by heat energy at a relatively low temperature.

The method is especially suitable for the process industry, for cleaning waste waters of a process by using the waste heat of the very process as a source of energy. Such an application is, for example, concentration of waste waters of a pulp bleaching plant by the waste heat released from the process at a temperature level of 50° C. The method is also applicable to other processes of the chemical industry in which components of a solution are to be separated from each other.

Crystals produced in freezing of some solutions such as, for example, brine, are pure solvent i.e. water, and the dissolved salts remain in the solution By separating the ice crystals from the solution and by washing and melting them, pure solvent can be separated from the concentrated solution.

The solution can be frozen by evaporating it at the triple point, where the solid, liquid and vapor phases are all in equilibrium with one another. In practice, when, for example, an aqueous solution is concentrated, this results in the temperature falling below the freezing point of pure water.

The vapor temperature is, in other words, below zero, causing the vapor to condense to ice onto heat transfer surfaces This is one of the weaknesses of the prior freezing methods. It has been avoided in some methods by compressing the vapor to a temperature higher than the freezing point by means of a compressor. The specific volume of the vapor, being huge at such temperatures, causes problems in the construction of a satisfactorily-operating compressor. Finnish patent No 73818 discloses compression of vapor by a steam jet ejector suitable for dilute solutions such as brine, which is used as a source of heat for a heat pump, the freezing point of the brine being not very much below the freezing point of pure water.

In the present invention, both condensation and re-evaporation of cold vapor is effected by an absorption heat pump, whereby the vapor is condensed into an absorbing liquid and does not form ice. In this case, the process is not very sensitive to the temperature of the vapor, which may be several degrees below zero.

Due to the low operating temperature, it i s possible to use waste heat for the heating of the vapor generator of the absorption heat pump, the temperature of such waste heat not exceeding 50° C. The absorber of the absorption heat pump can thus be cooled with cooling water, the temperature of which may exceed 20° C. The liquid to be frozen can be cooled near to the freezing point in a multistage flash evaporation plant, which is cooled by the discharge liquid melted from ice.

Considering the environmental protection, the process according to the present invention has several advantages; troublesome emissions in dilute solutions can be cleaned by waste energy, whereby not even heat pumps using freon are needed.

The invention is characterized by a method of freezing, in which the ice developed from the treated solution at the triple point is separated from the concentrated solution, which is discharged from the process; the vapor released from the solution is condensed into an absorption medium, which is cooled by a coolant warmer than the condensing vapor; the liquid absorbed from the vapor is re-evaporated at a higher temperature; part of such vapor is further taken to melt the ice separated from the solution and another part is absorbed in an absorber of a second absorption pump, and the pure liquid melted from the ice is taken to cool a multistage flash distillation process, where, by means of evaporation, the solution to be treated cools near to the freezing point.

Figure 2:
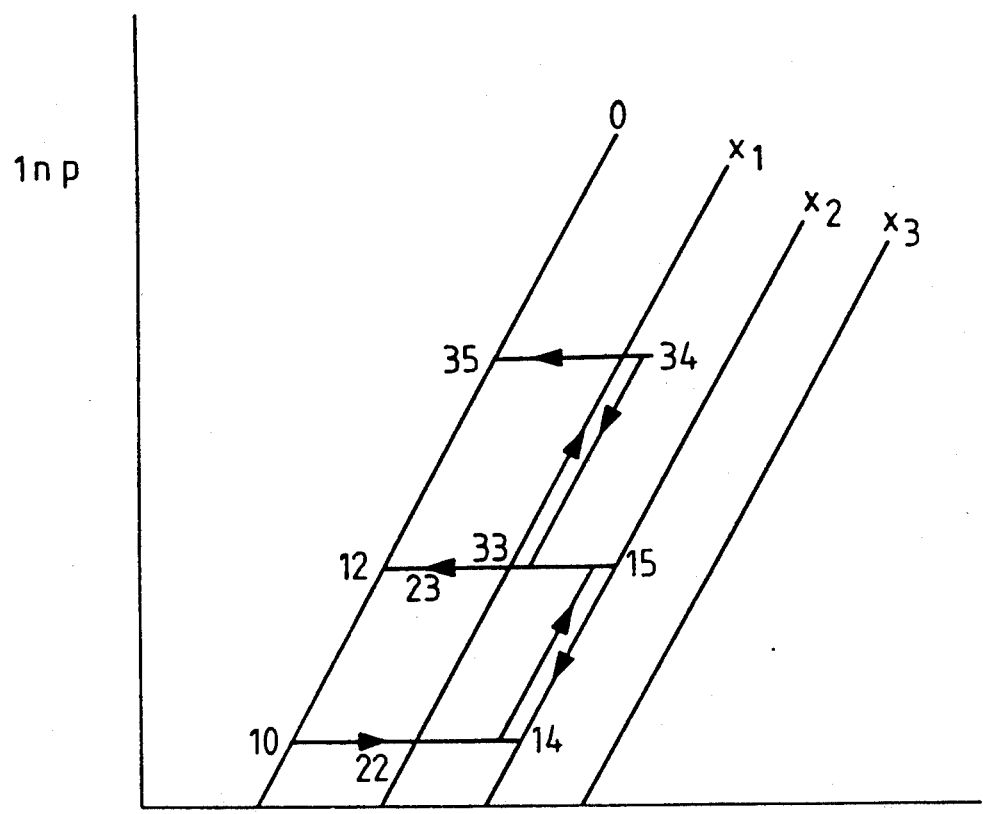

An embodiment of the invention is described more in detail below, by way of example and with reference to the accompanying drawings, in which FIG. 1 is a flow sheet schematically illustrating this embodiment; and FIG. 2 is an illustration of the same process by pTx curves.

The center of the process is a crystallizer 10, in which solution to be treated is brought to its triple point with respect to the pressure and temperature. Part of the solvent vaporizes, another part freezing at the same time. A mixture 25 of liquid and crystals flows to a separator 11 in which the ice crystals 24 rise to the surface and will be transferred through counter-current washing effected by a pure solvent to a melter 12.

Vapor 22 flows to an absorber 14 of an absorption heat pump, in which it will condense into an absorption medium, for example, a NaOH or a LiBr solution. The heat released in the absorption is transmitted through a heat exchanger 16 to a coolant, normally to cooling water. If, for example, the absorption medium is 50% NaOH, its temperature may be approximately 25° C. when it absorbs vapor at a temperature of $-10°$ C. Thus, the cooling water can be heated to a temperature of, for example, 20° C.

The diluted absorption medium 29 flows, pumped by a pump 18 to a vapor generator 15, which is heated by a heating agent through a heat exchanger 17. At a temperature of 40° C., vapor is evaporated from the absorption medium, the pressure of said vapor corresponding to a temperature of $+2°$ C. It is sufficient for melting ice in the melter 12, for the vapor 23 to be led thereto. Thus, the process described above operates if the temperature of the heating agent is, for example, 45° C. The concentrated absorption medium 30 flows back to the absorber and cools by flash evaporation to the operating temperature of said absorber The crystallizer may be, for example, an evaporator operating on the principle of a falling liquid film, to which evaporator a pump 13 circulates liquid 26, the amount of which is considerably greater than the amount of the solution to be treated, and along which liquid the ice crystals 25 readily flow to the separator 11. The liquid circulation is concentratred, the ratio of concentration being determined by the liquid 27 fed in and the concentrate 30 being discharged from the process. The ice crystals are thus prevented from adhering to each other o the walls.

The liquid 32 to be treated may be at a temperature considerably higher than the freezing point when entering 32 the first process stage, i.e. the deaeration 20. The solution can be cooled in a multi-stage flash evaporator 19 illustrated as a three-stage system in FIG. 1. The pressure in each stage is lower than that of the preceding stage, whereby the liquid is evaporated stage by stage to a lower temperature. The vapor is condensed in condensers 21, in which the pure liquid 28 discharged from the melter 12 flows as a coolant in counter-current to the liquid being vaporized. Concentrated cold solution 30 can also be used as a coolant of the flash evaporator 19 together with the liquid flowing out from the melter 12. The condensing vapor 31 is discharged as a pure liquid from the process and the solution 27 to be treated flows, cooled near to the freezing point, to the circulation of the crystallizer.

To ensure that the melted liquid discharged from the melter 12 is as cold as possible when it flows to the multi-stage flash distillation plant 19 to act as the cooling liquid thereof, excessive heat has to be removed from the process, said heat being the enthalpic difference between the entering and leaving flows 23, 22 of vapor. This can be effected, for example, by leading a part 36 of the entering vapor to an absorber of the first absorption pump and by evaporating it at a higher temperature in the vapor generator 34 of this absorption heat pump and by further condensing it, for example, in a jet condenser 35. In this manner, this vapor, the temperature of which has originally been near to the freezing point, can be also released at a sufficiently high temperature to the environment.

To ensure also that the second absorption heat pump can operate on low-temperature waste heat, it is advantageous to use a more dilute absorption medium than what is used in the actual first stage heat pump. This will be appreciated from FIG. 2, which illustrates the pTx curves of the process, i.e. the mutual dependency of the vapor pressure, temperature and concentration of the absorption medium. The points of operation of the process are denoted in this set of curves by the same reference numbers as in the flow sheet of FIG. 1 indicating the different stages of the process.

It will be appreciated from the set of curves that, vapor 23 released in the generator 15 from the more concentrated ($\times 2$) solution and flowing generally to the melter 12 can be absorbed (33) into a more dilute ($\times 1$) solution, which can be cooled at the temperature Tc, which is almost the same as that of the absorber 14 of the first stage. The vapor pressure of the generator 15 of the first absorption pump is thus almost the same as the vapor pressure of the absorber 33 of the second absorption heat pump, but the temperature of the first absorption pump is higher than that of the second absorption heat pump. Both generators 15 and 34 can be heated by a heating agent of the same temperature Th and the vapor 35 generated in the generator 34 of the second stage be condensed at almost the same temperature Tc, in which the absorbers are cooled.

We claim:

1. A method of concentrating a solution having a triple point, using a crystallizer, a melter, a first absorption heat pump having an absorber with absorption medium and a vapor generator, and a second adsorption heat pump having an absorber, the method comprising the steps of:
   (a) freezing and evaporating a solvent of the solution in the crystallizer, the crystallizer operating at the triple point of the solution, to produce ice crystals and absorbing vapor;
   (b) separating off ice crystals produced by step (a);
   (c) transferring the ice crystals from step (b) into the melter;
   (d) providing the absorbing vapor that is generated in the crystallizer to the first heat pump absorber, to be absorbed in the first heat pump absorption medium;
   (e) cooling the absorption medium of the first heat pump with a coolant, the coolant being warmer than the vapor to be absorbed;
   (f) re-evaporating the absorbed material in the vapor generator of the first absorption heat pump;
   (g) melting the ice crystals into a pure liquid using some of the vapor generated in step (f); and
   (h) absorbing any remaining vapor generated in step (f) in the absorber of the second absorption heat pump.

2. The method according to claim 1, further comprising the steps, to provide the solution in step (a), of:
   (i) cooling a solution near its triple point temperature by evaporating the solution stage by stage in a multi-stage flash evaporator; and
   (j) condensing the vapor in a condenser using a cooling liquid from the melter.

3. A method according to claim 2, wherein the cooling liquid used in step (j) is melted from ice crystals cooled in the crystallizer.

4. A method according to claim 2, wherein the cooling liquid used in step (j) is provided by melted ice crystals from the crystallizer and concentrated cold solution cooled in the crystallizer.

5. A method according to claim 2, wherein the cooling liquid medium is melted from concentrate cold solution cooled in the crystallizer.

6. A method according to claim 2 comprising the further step of operating the absorber of the second heat pump at a lower temperature than the vapor generator of the first heat pump.

7. A method according to claim 6 comprising the further step of providing the concentration of absorption medium in the first heat pump at a higher level than the concentration of absorption medium in the second heat pump.

8. A method according to claim 2 comprising the further step of providing the concentration of absorption medium in the first heat pump at a higher level than the concentration of absorption medium in the second heat pump.

9. A method according to claim 1 comprising the further step of operating the absorber of the second heat pump at a lower temperature than the vapor generator of the first heat pump.

10. A method according to claim 1 comprising the further step of providing the concentration of absorption medium in the first heat pump at a higher level than the concentration of absorption medium in the second heat pump.

* * * * *